Figure 5:
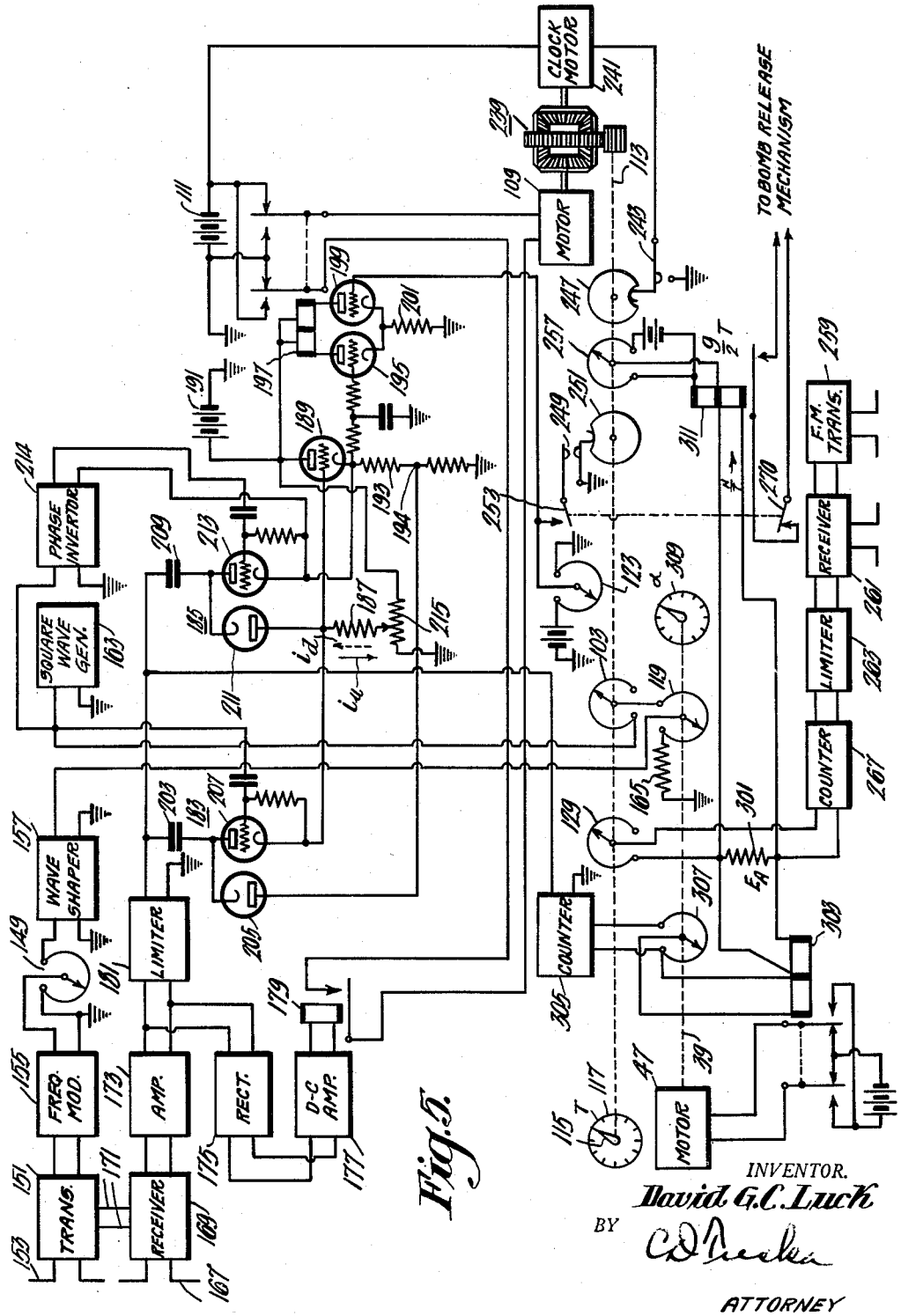

May 7, 1957   D. G. C. LUCK   2,791,766
RADIO BOMB RELEASE SYSTEM
Filed Dec. 23, 1944   3 Sheets-Sheet 1
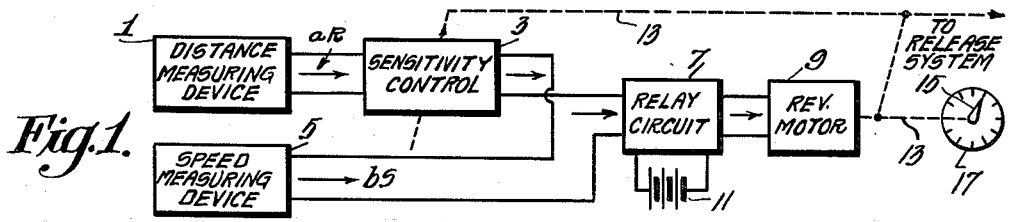
Fig. 1.
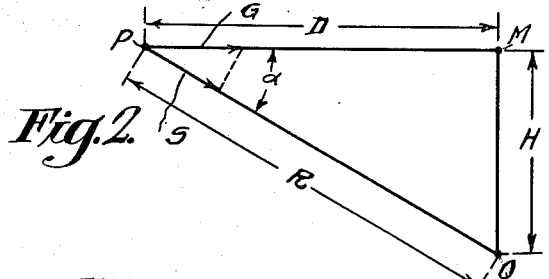
Fig. 2.
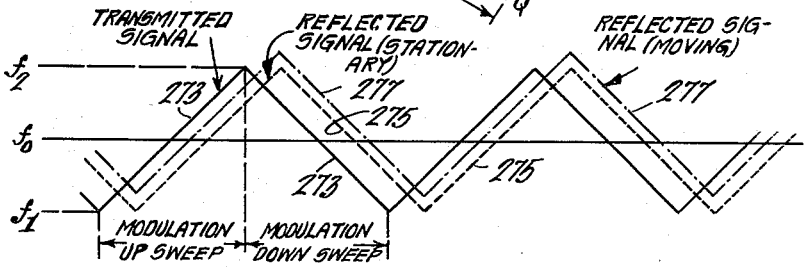
Fig. 6.
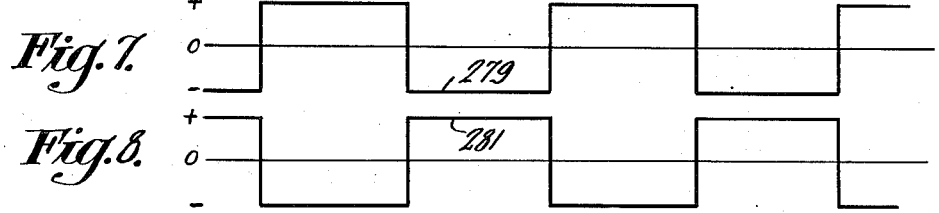
Fig. 7.
Fig. 8.
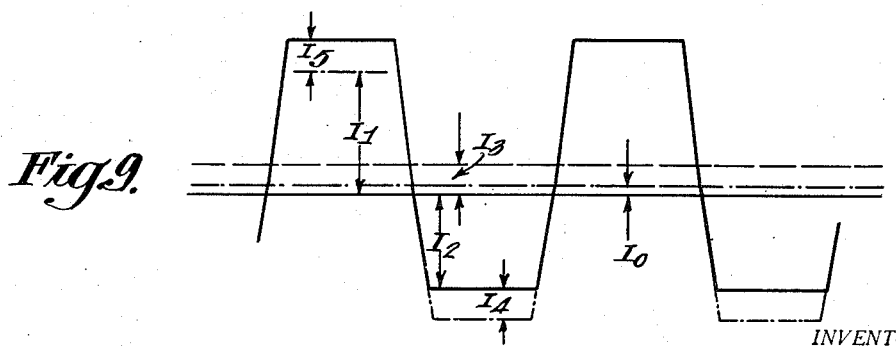
Fig. 9.
INVENTOR.
David G. C. Luck
BY
C. D. Tuska
ATTORNEY May 7, 1957   D. G. C. LUCK   2,791,766
RADIO BOMB RELEASE SYSTEM
Filed Dec. 23, 1944   3 Sheets-Sheet 2
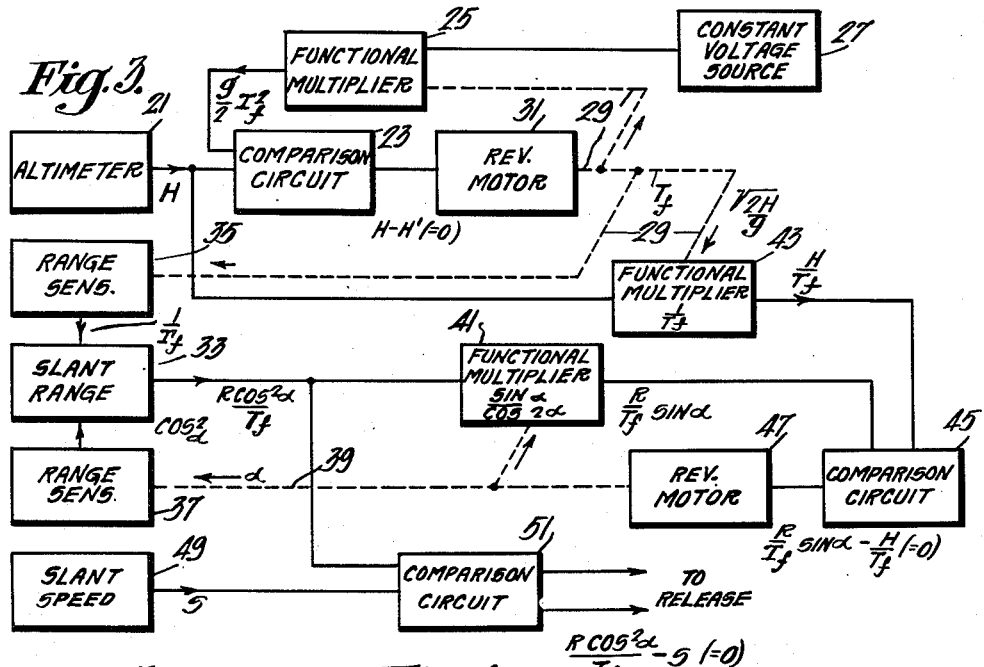
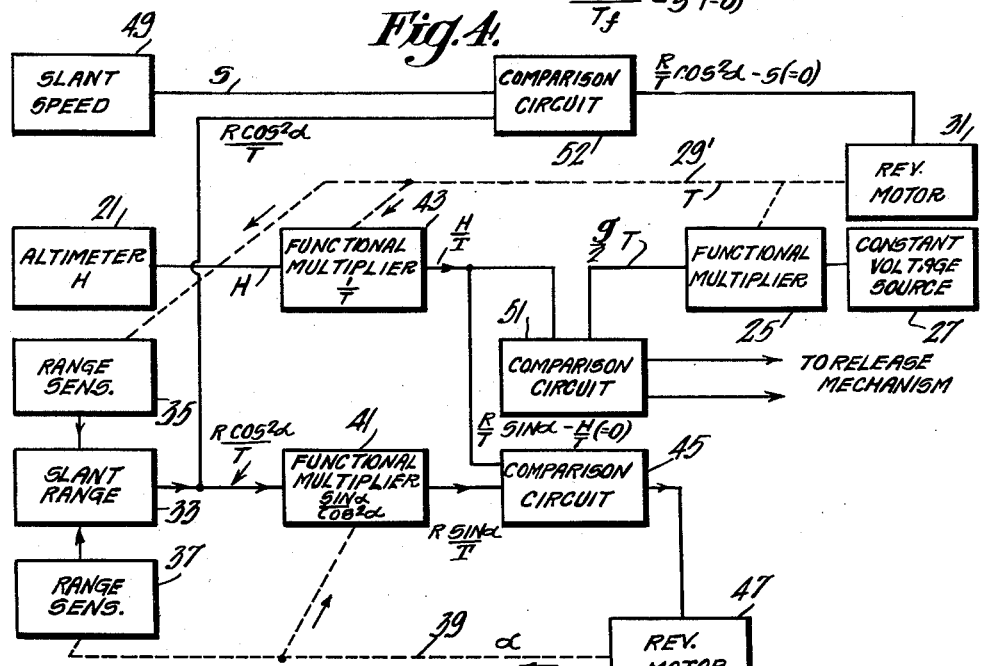
INVENTOR.
David G. C. Luck
BY
ATTORNEY INVENTOR.
David G.C. Luck
ATTORNEY United States Patent Office 2,791,766
Patented May 7, 1957

2,791,766

RADIO BOMB RELEASE SYSTEM

David G. C. Luck, Princeton, N. J., assignor, by mesne assignments, to the United States of America as represented by the Secretary of the Navy Application December 23, 1944, Serial No. 569,559

6 Claims. (Cl. 343—7)

This invention relates to radio bomb release systems, and more particularly to systems of the type described in copending U. S. application Ser. No. 556,852, filed October 2, 1944, by D. G. C. Luck and entitled Radio Bomb Release System, now Patent No. 2,433,284 dated December 23, 1947, wherein measurements are made substantially continuously of the distance and the speed of a bombing craft with respect to a selected target, by means of radio signals transmitted to the target and reflected therefrom back to the bomber. The speed and distance information is in the form of electrical voltages which are employed to cause release of a bomb upon the occurrence of the proper relationship between speed and distance for a hit.

Since radio reflection devices are responsive to the linear or "slant" distance (i. e. the distance along the straight line from the bomber to the target) and the "slant" component of the speed, it is necessary to consider the altitude of the bomber in order to determine the horizontal component of the target distance and the horizontal speed of the bomber. It is sometimes satisfactory to set in linearly approximate corrections for each altitude, automatically as described in the above-mentioned copending application Ser. No. 556,852, or manually, as described in copending U. S. application Ser. No. 524,794, filed on March 2, 1944 by R. C. Sanders, Jr. and W. R. Mercer and entitled Radio Bomb Release System, now Patent No. 2,412,632 dated December 17, 1946.

The principal object of the present invention is to provide an improved bomb release system wherein the altitude is included directly in the computation made by the system, rather than set in as a correction.

Another object of the invention is to provide a system of the described type wherein no approximation (other than the omission of a factor corresponding to air resistance) is involved in the operation.

A further object is to provide a system of the described type which provides continuously information as to time-from-target, or the remaining time at any instant to elapse before release is to occur.

The invention will be described with reference to the accompanying drawings, of which:

Figure 1 is a schematic block diagram of an elementary bomb release system of the time-from-target type, Figure 2 is a geometrical diagram illustrating the problem of bomb release from a moving aircraft, Figure 3 is a schematic block diagram of an improved bomb release system of the spotting or non-tracking type, embodying the present invention, Figure 4 is a schematic block diagram of a bomb release system of the target-tracking type embodying the present invention, Figure 5 is a schematic circuit diagram of a system of the same type as that of Figure 4, but including a "memory" system which enables substantially correct bomb release in the presence of signal fading conditions, Figure 6 is a group of graphs illustrating variations in frequency of the signals radiated and received in the operation of the system of Figure 5, Figures 7 and 8 are graphs of square wave voltages produced in the operation of the system of Figure 5, and Figure 9 is a graph illustrating the various components of the current provided by the differential counter circuits of the system of Figure 5.

Referring to Figure 1, a distance measuring device 1 is arranged to provide an output voltage having a magnitude proportional to the distance of the target or objective from a craft (not shown) carrying the equipment. The device 1 may comprise radio reflection equipment, similar to that used in the well known frequency modulation type of altimeter, or any other known means for providing the required distance-proportional output. The distance measuring device 1 is provided with a sensitivity control 3, which may be merely an adjustable attenuator, or may be any other means for controlling the proportionality of the output to distance.

A speed measuring device 5, which may also be of the radio reflection type, is arranged to provide an output voltage proportional to the speed of the mobile craft with respect to the objective. The output circuits of the speed and distance measuring devices 5 and 1 are connected to a relay circuit 7, in such manner that the two outputs oppose each other. The relay circuit 7 is connected to reversible motor 9 to control the energization thereof from a power source 11. The relay circuit 7 may include electromagnetically operated contact means, electron discharge tube means, or both, in accordance with known and conventional practice. The relay circuit 7 is adjusted so that when the polarity of the input thereto is similar to that of the output of the distance measuring device 1, the motor 9 is energized to run clockwise, for example. When the polarity of the input to the relay circuit 7 is similar to that of the output of the speed measuring device 5, the motor 9 is energized to run counterclockwise. The shaft of the motor 9 is mechanically coupled, as indicated schematically by the dash line 13, to the sensitivity control 3. An indicator 15, provided with a scale 17, is similarly coupled to the motor 9. The scale 17 may be calibrated in units of time, such as seconds.

In the operation of the above-described system, the distance measuring device 1 produces an output voltage $$e_d = aR$$

where R is the distance and $a$ is a constant determined by the design of the device 1. The speed measuring device 5 produces an output voltage $$e_v = bS$$

where S is the velocity and $b$ is a constant determined by the design of the device 5.

The sensitivity control 3 changes the voltage $e_d$ by a factor $r$, providing a voltage $$e'_d = raR$$

where the value of $r$ is a predetermined function of the mechanical setting, or angular position of the control shaft of the sensitivity control 3.

The voltages $e'_d$ and $e_v$ are applied, in opposition to each other, to the relay circuit 7. The resultant input to the relay circuit is thus $$e_0 = raR - bS$$

As long as $e_0$ is not equal to zero, the motor 9 will be energized to drive the shaft in the proper direction to reduce the difference between the speed and distance components of the voltage $e_0$, by varying the ratio $r$. The value of $e_o$ will be substantially continuously maintained at zero by this operation, and $$raR = bS$$

Factoring and transposing:

$$\frac{R}{S} = \frac{b}{ra}$$

The quantity $$\frac{R}{S}$$

is the distance of the objective divided by the speed with respect thereto. Subject to the condition that the motion is such as to decrease, rather than increase the distance R, $$\frac{R}{S} = T$$

where T is the time from target. Thus $$T = \frac{1}{r}k$$

where $k$ is a constant and equal to $$\frac{b}{a}$$

In order that the calibration of the scale 17 may be made linear, and the angular position of the shaft be directly, rather than inversely proportional to T, the control 3 may be constructed to provide a reciprocal characteristic of $r$ vs. rotation, or as an alternative, the mechanical connection 13 may include variable ratio gearing or cam means arranged in known manner to provide reciprocal variation of $r$ as a function of input shaft rotation. However obtained, this reciprocal characteristic need only extend over the range of time T required by the application of the equipment, i. e., not necessarily from $T=0$ to $T=\infty$. The indicator 15 will assume, within the limits of the operating range, an angular position which is a predetermined linear function of T, providing direct indication upon the scale 17. The shaft of the motor 9 may be coupled also to any other device to be controlled in accordance with the time from target T, such as a bomb release mechanism, not shown.

It will be apparent that a linear relationship between T and $r$ may be obtained also by controlling the response of the speed measuring device, rather than that of the distance measuring device. This arrangement is not illustrated in the drawing, since it involves merely the transfer of the control 3 from the output of the device 1 to that of the device 5, and modification of the control 3 to provide linear variation of sensitivity with T. The operation of the system as thus modified is identical with the operation of the system of Figure 1. The system of Figure 1 will provide correct indication of the time required for the bomber to reach a point directly above the target only under the condition that the altitude be negligible with respect to the distance. Referring to Figure 2, assume that a bomber, at present at the point P, is flying horizontally with a velocity G, at an altitude H, toward the point M, directly above a selected target situated at a point Q. The time which will be required for the bomber to reach the point M is the horizontal distance divided by the horizontal speed:

$$T = \frac{D}{G}$$

The quantities D and G, however, are not those measured by the devices 1 and 5. The distance measuring device 1 measures the slant range R, which is greater than the distance D, and the speed measuring device 5 measures the slant speed S, which is less than the horizontal speed G.

$$\frac{R}{S}$$

is not equal to the true time from target $$\frac{D}{G}$$

but differs from it by an amount which increases as the bomber approaches the point M. At this point, the measured distance R is equal to H and the measured speed S is zero, $$\frac{R}{S}$$

indicating infinite time from target rather than zero.

In accordance with the present invention, it is proposed to include the altitude H in the computation of the time from target T, rather than correcting the quotient $$\frac{R}{S}$$

to approximate T. From Figure 2, it is apparent that (1) $$G = S \sec \alpha$$

and (2) $$D = R \cos \alpha$$

where $$\sin \alpha = \frac{H}{R}$$

Since $$D = GT$$

(3) $$\frac{R}{T} \cos \alpha - \frac{S}{\cos \alpha} =$$

or (4) $$\frac{R}{T} \cos^2 \alpha - S = 0$$

Equation 4 is in terms of T, which is to be determined, R and S, which are measurable, and $\alpha$, which is a function of the measurable quantities of H and R.

The time of fall $T_f$ of a bomb is related to the altitude H (neglecting air resistance) as follows:

(5) $$\frac{H}{T_f} = \frac{g}{2} T_f$$

where $g$ is the gravitational acceleration, approximately 32.2 feet per second per second. The bomb should be released at the instant the time from target is equal to the time of fall. At this instant, from Equation 4, (6) $$\frac{R}{T_f} \cos^2 \alpha - S = 0$$

*Time of fall computor*

The various electrical connections in Figures 3 and 4 are indicated by single lines, since the diagram is only schematic. It will be understood, however, that the single lines each actually represent the number of wires necessary to effect the required connections.

Referring to Figure 3, an altimeter 21 preferably of the radio reflection type but in any event operable to provide an output voltage proportional to the altitude H, is connected to a voltage comparison circuit 23 like the relay circuit 7 of Figure 1. Also connected to the comparison circuit 23 is a functional multiplier 25, which receives electrical input from a constant voltage source 27 and mechanical input from a shaft 29. The functional multiplier 25 may be merely a variable voltage divider or so-called potentiometer, having a predetermined resistance vs. rotation taper, or may be a linear voltage divider arranged to be driven through a cam or variable ratio gearing arrangement to provide the required characteristic, or any known equivalent thereof. The shaft 29 is coupled to a reversible motor 31, which is controlled by the comparison circuit 23 in response to the difference of the two electrical inputs thereto, exactly as the motor 9 of Figure 1 is controlled by the relay circuit 7.

The portion of the system of Figure 3 described thus far is a servo system, responding to the H input from the altimeter 21 to adjust the angular position of the shaft 29 of the motor 31. The motor 31 drives the multiplier 25 to a position such that the output of the multiplier 25 is equal to that of the altimeter 21. The multiplier is tapered or otherwise designed in accordance with known practice to have a parabolic characteristic, so that in order to provide an output voltage equal to that of the altimeter, the multiplier input shaft 29 must be in an angular position, with respect to a predetermined reference position, corresponding to the time of fall $T_f$ of a bomb released at the altitude H. In other words, the system calculates $T_f$, which from Equation 5 is equal to $$\sqrt{\frac{2H}{g}}$$

*Angular depression of target computor*

A distance or slant range measuring device 33, which may be similar to the device 1 of Figure 1, is arranged to respond to the slant range R. The sensitivity of the device 33 is controllable by means of two sensitivity controls 35 and 37. The controls 35 and 37 may be any known means for controlling the extent of the response to target range of the device 33. A preferred arrangement will be described with reference to Figure 5.

The range sensitivity control 35 is coupled to the $T_f$ shaft 29, and is designed like the control 3 of Figure 1 to provide reciprocal control, so that the output of the distance measuring device 33 is modified by the factor $$\frac{1}{T_f}$$

The range sensitivity control 37 is similarly designed to modify the range output in proportion to the square of the mechanical input thereto, which is applied by a shaft 39.

The electrical output of the slant range measuring device 33 is applied to a functional multiplier 41, which is also controlled by the shaft 39. The multiplier 41, like the multiplier 25, may be a cam-driven or a tapered voltage divider. It is designed to multiply its input voltage by the sine of the angular position of the shaft 39, and at the same time divide the input by the square of the cosine of the position angle of the shaft 39.

The H output of the altimeter 21 is applied to a third functional multiplier 43, coupled to the $T_f$ shaft 29 and designed to provide a reciprocal characteristic, so that the output voltage is proportional to $$\frac{H}{T_f}$$

This voltage, together with the output of the multiplier 41, is applied to a comparison circuit 45 like the comparison circuit 23. The comparison circuit 45 is connected to a reversible motor 47. The motor 47 is coupled to the shaft 39.

In operation, the motor 47 will run in one direction or the other until the position of the shaft 39 corresponds to the target depression angle $\alpha$. (See Figure 2.) When this condition is fulfilled, the output of the distance measuring device is $$\frac{R \cos^2 \alpha}{T_f}$$

The multiplier 41 modifies this by multiplying $$\frac{R \cos^2 \alpha}{T_f} \text{ by } \frac{\sin \alpha}{\cos^2 \alpha}$$

providing an output $$\frac{R}{T_f} \sin \alpha$$

This output is compared in the comparison circuit 45 with the output $$\frac{H}{T_f}$$

of the multiplier 43. Now if the shaft 39 is at the position corresponding to $\alpha$, $$\frac{R}{T_f} \sin \alpha - \frac{H}{T_f} = 0$$

(i. e. $R \sin \alpha = H$, see Figure 2) and the motor 47 remains deenergized. If not, the motor 47 runs to drive the shaft 39 to the correct position. Thus the shaft 39 is substantially continuously maintained at the position $\alpha$.

*Bomb release*

A speed measuring device 49, similar to the device 5 of Figure 1, provides an output proportional to the slant speed S. This is applied to a comparison circuit 51. The output of the slant range measuring device 33, $$\frac{R \cos^2 \alpha}{T_f}$$

is also applied to the comparison circuit 51. The comparison circuit 51, instead of controlling a motor, is connected to a bomb release mechanism (not shown) to release when the inputs from the devices 33 and 49 are equal:

$$\frac{R}{T_f} \cos^2 \alpha - S = 0$$

This is Equation 6, above, which represents the conditions for release. Thus the missile is dropped at the proper instant, regardless of the relationship between altitude and range, without approximation.

*Target tracking system*

The system of Figure 3 operates upon the occurrence of the proper conditions, but does not afford any prediction as to when such conditions will exist. It is desirable to know how long, under present conditions, it will be before the time for release. One reason for this is to give the pilot of the bombing craft a warning that the bomb is about to be dropped. Another reason is that time from target information, continuously predicted by the system, may be employed to set a clock automatically, so that if the radio signals fail, the bomb can still be dropped at approximately the correct instant in response to the clock.

The system of Figure 4 provides time from target information. Similar reference characters are used in Figures 3 and 4 to designate similar elements. An altimeter 21, distance or slant range and speed measuring devices 33 and 49, and range sensitivity controls 35 and 37 are provided, as in the system of Figure 3. The time shaft 29', which is to be positioned in accordance with time from target T, is coupled to the reversible motor 31, to the range sensitivity control 35, the reciprocal functional multiplier 43, and to the functional multiplier 25. The motor 31 is controlled by a comparison circuit 52, which is connected to the speed measuring device 49 and the distance measuring device 33.

The target depression angle shaft 39 is coupled to the range sensitivity control 37 and the multiplier 41, as in the system of Figure 3. The reversible motor 47 which positions the $\alpha$ shaft 39 is controlled by the comparison circuit 45 in response to the outputs of the multipliers 25 and 43.

The operation of the system of Figure 4 is as follows: If the output of the comparison circuit 52 is not initially zero, the motor 31 is energized to drive the shaft 29' in one direction or the other, adjusting the multipliers 25 and 43 and the sensitivity control 35. Simultaneously, unless the output of the comparison circuit 45 is zero, the motor 47 rotates the shaft 39, adjusting the sensitivity control 37 and the multiplier 41.

There will be interaction between the control circuits of the motors 31 and 47, since the shaft 29' affects the energization of the motor 47, through the multiplier 43 and the comparison circuit 45, and the shaft 39 affects that of the motor 31 by means of the range sensitivity control 37. However, the two systems will adjust themselves so that boh motors are deenergized. When this condition is attained, the position of the shaft 29' corresponds to T, and that of the shaft 39 corresponds to $\alpha$. The output of the slant range measuring device 33 is then $$\frac{R \cos^2 \alpha}{T}$$

This is compared with the slant speed S in the comparison circuit 51, and the two should be equal. (See Equation 4.) If they are not, the motor 31 runs to correct the position of the time shaft 29'.

The range output $$\frac{R \cos^2 \alpha}{T}$$

is also applied to the multiplier 41, which multiplies it by $$\frac{\sin \alpha}{\cos^2 \alpha}$$

to provide an output corresponding to $$\frac{R \sin \alpha}{T}$$

The output H of the altimeter 21 is converted to $H/T$ by the multiplier 43. This is applied to the comparison circuit 45, together with the output $$\frac{R \sin \alpha}{T}$$

from the multiplier 41. Since $H = R \sin \alpha$, $H/T$ must equal $$\frac{R \sin \alpha}{T}$$

If the outputs of the multipliers 41 and 43 are not equal, the comparison circuit energizes the motor 47 to correct the position of the $\alpha$ shaft 39.

The functional multiplier 25 operates on the output of the constant voltage source 27, in response to the time shaft 29', to provide an output voltage corresponding to $$\frac{gT}{2}$$

This voltage is applied to the comparison circuit 51, together with the $H/T$ output of the multiplier 43. When $H/T$ is equal to $$\frac{gT}{2}$$

T is equal to $T_f$ (see Equation 5) and the release mechanism is energized.

The system of Figure 4 thus provides release under the same conditions as that of Figure 3, i. e. when $T = T_f$, but in addition provides a time from target shaft 29'. This shaft may be utilized to operate an indicator, like the system of Figure 1, and also to set a clock for "memory" operation.

*Target tracking with "memory"*

Figure 5 shows the circuit details of the various multipliers and controls of a system like that of Figure 4, with the addition of a "memory" clock arrangement. The latter portion of the system is substantially identical with that described in U. S. application Ser. No. 556,852. In the practical application of the invention, it has been found desirable to combine the functions of distance measuring and speed measuring in a single system employing but one receiver and one transmitter. A separate transmitter-receiver system is employed for measurement of the altitude H.

Referring to Figure 5, a radio transmitter 151 is connected to an antenna 153 and to a frequency modulator 155. The modulator 155 may be of the vibratory variable capacitor type such as that described in copending application Ser. No. 471,003 filed January 1, 1943 by S. V. Perry and entitled Capacity Modulator Unit, now abandoned, or any other known device for varying the frequency of the transmitter 151 in response to a modulating voltage. The input circuit of the modulator 155 is connected through a manually adjustable voltage divider 149 to a wave shaping circuit 157 which is connected through a voltage divider 119, a series rheostat 103 and a resistor 165 to a square wave generator 163. The rheostat 103 has a linear resistance-rotation characteristic. Since the output of the square wave generator 163 is of constant amplitude, the current through the resistor 165 and the voltage divider 119 is inversely proportional to the angular position of the movable contact of the rheostat 103.

A receiving antenna 167, similar in construction to the antenna 153 is connected to a receiver 169. The transmitter 151 is also connected to the receiver 169 through a line 171. Both antennas 153 and 167 are preferably directive, and are arranged to provide maximum response in the same direction.

The output circuit of the receiver 169 is connected to an amplifier 173. The output circuit of the amplifier 173 is connected to an amplitude limiter 181. The output circuit of the limiter 181 is conected to a pair of averaging cycle counter circuits, generally designated by the reference numerals 183 and 185 respectively.

The counters 183 and 185 are provided with a common load resistor 187 which is connected to the control grid of an amplifier tube 189. The anode of the tube 189 is connected directly to a D.-C. source 191. The cathode circuit of the tube 189 includes a resistor 193 tapped at an intermediate point 194. The cathode of the tube 189 is connected to the control grid of a tube 195. The anode circuit of the tube 195 includes one winding of a differential relay 197. The other winding of the relay 197 is connected in the anode circuit of a tube 199. Anode potential is applied to the tubes 195 and 199 by the source 191. The cathodes of the tubes 195 and 199 are connected to ground through a common resistor 201.

The counter 183 includes a capacitor 203 connected to the cathode of a diode 205 and to the anode of a triode 207. The cathode of the tube 207 is connected to the load resistor 187. The control grid of the tube 207 is connected to the square wave generator 163. The anode of the diode 205 is connected to the cathode circuit of the tube 189 at the point 194 on the resistor 193. The counter 185 comprises a capacitor 209 connected to the cathode of a diode 211 and to the anode of a triode 213. The anode of the diode 211 is connected to the load resistor 187. The cathode of the triode 213 is connected to the cathode of the tube 189. The control grid of the tube 213 is connected to the output circuit of a phase inverter 214, which is connected to the square wave generator 163. The lower end of the load resistor 187 is connected to the adjustable tap of a voltage divider 215, which is connected across the source 191.

The output circuit of the amplifier 173 is connected to a rectifier 175. The output of the rectifier 175 is applied to a D.-C. amplifier 177, which is connected to a relay 179. The amplifier 177 is biased so that the relay 179 is open in the absence of output from the amplifier 173, and is closed when the output of the amplifier 173 exceeds a predetermined value.

The relay 197 is provided with a double-throw double-pole contact arrangement connecting a battery 111 to the armature circuit of a reversible motor 109 so that when the relay armature is in one position the motor 109 is energized to run in one direction, and when the relay armature is in its other position, the motor 109 is energized to run in the opposite direction. This circuit also includes the contacts of the relay 179 so that if the received signal fails, the motor 109 is deenergized.

The operation of the system thus far described is as follows: The square wave voltage output of the generator 163 is attenuated to an extent depending upon the positions of the adjustable taps of the resistor 103 and the voltage divider 119, and is applied to the wave shaping circuit 157. The wave shaping circuit 157 includes a filter or other means for modifying the square wave input to produce an output of wave shape suitable for driving the modulator 155 so as to cause triangular wave variation of frequency of the transmitter 151. The output of the wave shaping circuit 157 is further attenuated by the voltage divider 149 and applied to the modulator 155. The frequency modulated signal produced by the transmitter 151 is radiated by the antenna 153 to the target, not shown. Part of the energy striking the target is reflected to the receiving antenna 167. The received reflected signal is combined in the receiver 169 with some of the original frequency modulated signal, which is conducted directly from the transmitter 151 to the receiver 169 through the line 171. The output of the receiver 169 includes a beat signal having a frequency equal to the difference between the instantaneous frequencies of the transmitted and received signals. The beat output of the receiver 169 is amplified by the amplifier 173 and limited to a constant amplitude by the limiter 181. The output of the limiter 181 is a square wave voltage having a frequency equal to the difference between the frequencies of the transmitted and received signals and a constant amplitude $E_s$.

Referring to Figure 6, the frequency of the transmitted signal is represented by the solid line 273. This frequency varies uniformly throughout the modulation cycle in response to the triangular wave output of the wave shaping circuit 157, between upper and lower limits $f_2$ and $f_1$, respectively, about a mean value $f_0$. The sweep width $f_2-f_1$ proportional to the amplitude of the triangular wave input to the modulator 155, and hence is a function of the position of the adjustable contacts of the voltage dividers 149 and 119, and the rheostat 103. Assuming that there is no relative motion between the bomber and the target, the reflected signal is delayed with respect to the transmitted signal by the time required for the radiation to travel from the transmitting antenna 153 to the target, and back to the receiving antenna 167. This is indicated by the dotted line 275 in Figure 2. The reflected signal varies in frequency over the same range $f_2-f_1$ as the transmitted signal, but constantly differs in frequency from the transmitted signal by an amount proportional to the distance. This difference in frequency is $$\frac{4Wf_mR}{984} \text{ cycles per second}$$

where $W=f_2-f_1$ in megacycles per second, $f_m$ is the modulation frequency in cycles per second, or frequency of operation of the square wave generator 163, 984 is the velocity of wave propagation in feet per microsecond, and R is the distance in feet. If the equipment is moving toward the target, the received signal is increased in frequency, owing to Doppler effect, by an amount $$\frac{2Sf_0}{984}$$

where S is the velocity in feet per second, $f_0$ is the carrier frequency in megacycles per second and 984 is the velocity of radiation propagation in feet per microsecond. The frequency of the received signal with relative motion is represented by the dash line 277 in Figure 6. This frequency varies throughout the modulation cycle over a frequency band which is equal in width to that of the transmitted signal. The difference in frequency between the transmitted and the received signal is $$f_u = \frac{4Wf_mR}{984} - \frac{2Sf_0}{984}$$

cycles per second during increase in frequency of the transmitted signal, and $$f_d = \frac{4Wf_mR}{984} + \frac{2Sf_0}{984}$$

cycles per second during decrease in frequency of the transmitted signal.

The constant amplitude beat frequency output of the limiter 181 is applied to both of the counters 183 and 185. During the modulation upsweep, or increase in frequency of the transmitted signal, the square wave generator 163 applies a positive pulse to the control grid of the triode 207 and to the phase inverter 214, as indicated by the graph of Figure 7. The phase inverter provides a negative pulse which is applied to the control grid of the triode 213 of the counter 185, as indicated by the graph of Figure 8. The triode 213 is thereby cut off, and the counter 185 is prevented from operating. The triode 207 is conductive, allowing the capacitor 203 to charge through the resistor 187 during positive half cycles of the output of the limiter 181. During negative half cycles of the limiter output, the capacitor 203 is discharged through the diode 205 to the potential appearing at the tap 194 of the resistor 193, which is slightly less than the potential at the cathode of the tube 189 and hence the cathode of the tube 207. The values of the capacitor 203 and resistor 187 are such that the capacitor 203 becomes substantially fully charged to the limiter output voltage $E_s$ during each cycle of the limiter output. Thus during the modulation upsweep, the counter 183 causes a current $i_u$ to flow downward through the resistor 187, as indicated by the solid arrow. This current is proportional to the product of the charge deposited in the capacitor 203 during each cycle, and the number of cycles per second:

$$i_u = f_u Q = f_u C_1 E_s$$

where $f_u$ is the beat frequency, Q is the charge per cycle, $C_1$ is the capacitance of the capacitor 203, and $E_s$ is the amplitude of the output of the limiter 181. Since $$f_u = \frac{4Wf_mR - 2Sf_0}{984}$$

$$i_u = \frac{4Wf_mRC_1E_s - 2f_0SE_sC_1}{984}$$

During the modulation downsweep, the square wave generator 163 provides a negative pulse at the grid of the triode 207 and the phase inverter 214, and a positive pulse at the grid of the triode 213, as indicated by the portions 279 and 281, respectively, of the graphs of Figures 7 and 8. The counter 183 is now inoperative and the triode 213 is conductive. During negative half cycles of the limiter output, the capacitor 209 is charged through the diode 211 and the resistor 187. During positive half cycles, the capacitor 209 is discharged through the triode 213 to the potential existing at the cathode of the tube 189, which is substantially equal to that at the anode of the diode 211. Thus during the modulation downsweep, the counter 185 causes an average current $i_d$ to flow upward through the resistor 187 as indicated by the dash arrow. This current is proportional to the product of the charge deposited in the capacitor 209 during each cycle, and the number of cycles per second:

$$i_d = f_d Q = f_d C_2 E_s$$

where $C_2$ is the capacitance of the capacitor 209. Since $$f_d = \frac{4Wf_mR + 2Sf_0}{984}$$

$$i_d = \frac{4Wf_mRC_2E_s + 2f_0SC_2E_s}{984}$$

The average current through the resistor 187 is $$i_0 = i_u - i_d$$

$$i_0 = \frac{4Wf_mRE_s}{984}(C_1 - C_2) - \frac{2f_0SE_s}{984}(C_1 + C_2)$$

Refer to Figure 9, wherein $I_1$ is the average component of current during upsweep due to distance, $I_2$ is the average component of current during downsweep due to distance, $I_3$ is the resultant average component of current due to distance, $I_4$ is the increase in negative average component of current during downsweep due to speed, and $I_5$ is the decrease in positive average current during upsweep due to speed. The resultant average voltage across the resistor 187 is $$e_0 = i_0 R$$

where R is the resistance of the resistor 187.

The tap of the voltage divider 215 is adjusted to apply a positive potential, of for example, 70 volts to the lower end of the resistor 187. The purpose of this arrangement is to provide a suitable operating point for the cathode follower tube 189. This voltage is denoted hereinafter as $e_1$. It may be varied over a small range by means of voltage divider 215 to provide initial adjustment of the system. The total voltage at the control grid of the tube 189, referred to ground potential, is $e_0 + e_1$. Inasmuch as the entire load of the tube 189 is in the cathode circuit, the anode current will assume a value such that the drop in said load circuit is very slightly greater than the voltage betwen the control grid and ground, and as a practical matter, is substantially equal to the grid voltage. Thus the voltage at the control grid of the relay tube 195, with respect to ground potential is $e_0 + e_1$.

The differential relay 197 responds to the difference between the anode currents of the relay tubes 195 and 199. If the anode current of the tube 195 is greater than that of the tube 199, the relay 197 operates in one direction while if the current of the tube 199 is greater, the relay operates in the other direction. The relay 197 may be designed so that it will remain in its mid position when the currents of the tubes 195 and 199 are equal. A voltage $e_2$ appears at the variable tap of the voltage divider 123. This voltage is applied to the control grid of the tube 199. When $e_2$ equals $e_1 + e_0$, the control grids of the tubes 195 and 199 are at equal potentials. The anode currents are equal, and the armature of the relay 197 remains in its central position, de-energizing the motor 109. The motor 109 is energized for operation in one direction when $e_1 + e_0$ is greater than $e_2$, and the other direction when $e_1 + e_0$ is less than $e_2$. Thus as long as there is any difference between $e_1 + e_0$ and $e_2$, the motor 109 will be energized to run in the corresponding direction.

The motor 109 is mechanically coupled to one input shaft of a differential 239. The other input shaft of the differential 239 is connected to a constant speed clock motor 241. The motor 241 is connected to the battery 111 through a switch 243. The output shaft 113 of the differential 239 carries a cam 247 arranged to open the switch 243 when the shaft 245 is in a predetermined angular position. A second switch 249 similar to the switch 243 is arranged to be operated by a cam 251, also on the shaft 113. The cams 247 and 251 are designed so that the switch 243 remains open over a slightly greater range of rotation of the shaft 113 than the switch 249. The switch 249 is connected through a manually operable switch 253 between the grid of the relay tube 199 and ground.

The above-described arrangement of the switches 243, 249 and 253 is for the purpose of resetting of the shaft 113 to its starting position, and operates as follows:

When the shaft 113 is in any other than starting position, the switches 243 and 249 are closed by the cams 247 and 251. If the switch 253 is now closed, the control grid of the tube 199 will be grounded, causing the tube 199 to draw considerably more current than the tube 195. The relay 197 is correspondingly actuated, causing the motor 109 to run continuously in one direction. The shaft 113 is driven thereby, through the differential 239, until the switch 243 opens, whereupon the clock motor 141 is stopped. Substantially at the same time, the switch 249 is opened by the cam 251, restoring the control grid of the tube 199 to its original potential $e_2$, whereupon the motor 109 is de-energized until some change occurs in the value of $e_0$.

The shaft 113 is also coupled to the movable contact of the resistor 103, and to a pair of variable resistors 129 and 257. An indicator 115 provided with a time dial 117 is coupled to the shaft 113 as in the systems of Figure 1.

A radio altimeter of conventional design is provided, comprising an FM transmitter 259, a receiver 261, a limiter 263, and a counter 267. In operation, the transmitter 259 sends a frequency modulated signal downward. The signal is reflected by the surface and received by the receiver 261, where it is compared with the transmitted signal to provide a beat signal having a frequency proportional to the altitude H. The beat signal is limited to a constant amplitude by the limiter 263 and applied to the counter 267, which operates like the counter 185, with the exception that it operates continuously rather than intermittently, to provide an output proportional to the altitude H.

The output circuit of the counter 267 is connected through the variable resistor 129 to a fixed resistor 301. The resistor 301 is relatively low in resistance as compared to the resistor 129, so that the voltage drop across the resistor 301 is substantially inversely proportional to the angle of position of the shaft 113, with respect to its zero position, and directly proportional to the output of the counter 267.

A differential relay 303 has one of its coils connected across the resistor 301. The other coil of the relay 303 is connected through a voltage divider 307 to a counter 305. The counter 305, like the altimeter counter 267, is arranged to operate continuously, and is connected to the output circuit of the limiter 181. The output of the counter 305 is substantially proportional to the slant range, the proportionality being determined by the positions of the sweep width controls 103, 119, 149. The voltage divider is tapered or cam driven as mentioned above with respect to the multiplier 25 in the system of Figure 3.

The contacts of the relay 303 are connected to a reversible motor 47 which is mechanically coupled by a shaft 39 to the voltage dividers 119 and 307, and to an indicator 309, which may be calibrated in terms of the target depression angle $\alpha$.

A differential relay 311, arranged to close its contacts when the two inputs to it are equal, has one of its windings connected across the resistor 301 and the other of its windings connected to the voltage divider 257. The contacts of the relay 311 are connected through a manually operated arming switch 270 to the bomb release mechanism. The arming switch 270 is ganged with the time shaft reset switch 253, so that when the release is disarmed, the shaft is automatically set to its starting position.

*Operation of tracker*

At the beginning of a bombing run toward a selected target, the arming switch 270 is closed, opening the switch 253. The time shaft 113 is at its extreme position corresponding to maximum time from target. The $\alpha$ shaft consequently is at its extreme position corresponding to minimum target depression angle $\alpha$. The motors 109 and 241 are both deenergized and remain so until the target reflected signal is picked up by the receiving equipment, operating the relay 179 to close the circuit of the motor 109. The motor 109 rotates the shaft 113 slightly away from its initial position, closing the circuit of the clock motor 241, which thereafter drives the shaft 113 through the differential 239 so that the indicator 115 moves over the scale 117 at a rate corresponding to the passage of time.

If the time from target as determined by the radio equipment does not equal the time T indicated, the relay 197 is actuated to energize the motor 109. The motion of the motor 109 is added in the differential 239 to that of the clock motor 241, setting the position of the shaft 113 to correspond to the measured time from target.

If the time from target as determined by the radio equipment does not remain equal to that indicated by the position of the shaft 113, the motor 109 is again energized to provide the proper correction. As long as the indicated time corresponds to the measured time, the motor 109 is deenergized and the shaft 113 is driven only by the clock motor 241. If the reflection signal fails, the relay 179 opens, disconnecting the motor 109 and the indicator will continue to function, although no corrections will be made until the signal again comes in.

As the target is approached, the shaft 113 rotates toward its minimum position. The shaft 39 rotates away from its minimum position, in response to rotation of the rheostat 129 by the time shaft 113, and decrease of the output of the range counter 305, to conform to the increasing depression angle $\alpha$. The time from target system is corrected to compensate for the increasing value of $\alpha$, through the voltage divider 119.

The calibration of the system is adjusted by means of the voltage dividers 149, 215 and 123 so that the voltage at the tap of the voltage divider 257 is equal to the drop across the resistor 301 when the angular positions of the shafts 39 and 113 correspond to the condition that $$H/T \text{ is equal to } \frac{gT}{2}$$

as in the system of Figure 4. The relay 311 then operates, closing the circuit to the bomb release mechanism.

*Summary*

The invention has been described as an improved radio bomb release system wherein the slant range, slant speed and altitude of a bomber with respect to a target are measured substantially continuously by radio reflection means. The slant speed and range information are combined with the altitude information to actuate a shaft in accordance with the target depression angle $\alpha$. The $\alpha$ information is combined with the slant speed and range information to provide time from target information. The bomb is released at the instant the time from target is equal to the time of fall.

I claim as my invention:

1. In a radio bomb release system including radio reflection means providing a range output voltage proportional to the slant distance R of a bombing craft from a selected target and a speed output voltage S proportional to the slant speed of said craft with respect to said target, and altimeter means providing an altitude output voltage H proportional to the altitude of said craft, a follow-up system including a time output shaft and responsive to said speed output voltage and said range output voltage to position said time shaft in accordance with the time from target T, means responsive to the position of said time shaft to control the range sensitivity of said radio reflection system, means responsive to the position of said time shaft and to said altitude output voltage to provide a voltage proportional to $H/T$, a second follow-up system including a target depression angle $\alpha$ shaft and responsive to said $H/T$ voltage and to said range output voltage to control the position of said $\alpha$ shaft, means responsive to the position of said $\alpha$ shaft to superimpose a further control upon the range sensitivity of said radio reflection system, means responsive to the position of said $\alpha$ shaft to control the effect of said range output voltage upon said second follow-up system, and means responsive to the position of said time shaft and to the value of said $H/T$ voltage to effect bomb release upon the occurrence of the condition $$H/T = \frac{gT}{2}$$

2. A radio bomb release system, including radio reflection means providing output voltages proportional respectively to altitude H, slant range R, and slant speed S, of a bombing craft with respect to a selected target, means responsive to said speed and range voltages to control the range sensitivity of said radio reflection means, means responsive to said range and altitude voltages to control further said range sensitivity, and means responsive to said altitude voltage and to the extent of said first range sensitivity control to effect bomb release upon the occurrence of a predetermined relationship between said altitude voltage and said first range sensitivity control.

3. A radio bomb release system including means providing an output voltage of $E_1 = a(bR-S) + e_1$ wherein $a$ is a constant, $b$ is a factor depending upon an adjustment of said means, R is the slant distance of a bomber from a selected target, S is the slant speed of said bomber with respect to said target, and $e_1$ is a bias voltage applied to said means, and an output voltage $E_2 = cbR$, wherein $c$ is a constant, altimeter means providing an output voltage $E_3 = kH$, wherein $k$ is a constant and H is the altitude of said craft, follow-up means including a time output shaft and responsive to the output voltage $E_1$ to rotate said time shaft to a position corresponding to the time from target T, means responsive to said time shaft to control said factor $b$, further means responsive to said time shaft and to said voltage $E_3$ to provide a voltage $E_4$ proportional to $H/T$, further follow-up means including a second shaft, and responsive to said voltage $E_4$ and to said voltage $E_2$ to control the position of said second shaft, means responsive to said second shaft to superimpose a further control upon said factor $b$, means responsive to the position of said time shaft to provide a voltage $E_5$ proportional to $$\frac{gT}{2}$$

wherein $g$ is a constant, and differential relay means responsive to said voltages $E_4$ and $E_5$.

4. A radio bomb release system including radio reflection means providing an output voltage $E_1 = a(bR-S)$, wherein $a$ is a constant, $b$ is a factor determined upon an adjustment of said means, R is the slant distance of a bombing craft from a selected target, and S is the slant speed of said craft with respect to said target, an output voltage $E_2 = cbR$, wherein $c$ is a constant, and an output voltage $E_3 = kH$, wherein $k$ is a constant and H is the altitude of said craft, a time shaft, means for rotating said time shaft in response to said voltage $E_1$ to a position corresponding to the time from target, T, means responsive to the position of said time shaft to control the value of said factor $b$ so that said voltage $E_1$ is maintained at zero substantially continuously, means responsive to the position of said time shaft and to said voltage $E_3$ to provide a voltage $E_4$ proportional to $H/T$, a second shaft, means responsive to the position of said second shaft and to said voltage $E_2$ to provide a voltage $E_6$, means responsive to the difference between said voltage $E_6$ and said voltage $E_4$ to rotate said second shaft, whereby said difference $E_6 - E_4$ is maintained at zero, means responsive to the position of said second shaft to superimpose a further control upon said factor $b$, means responsive to the position of said time shaft to provide a voltage $E_5$ proportional to T, and differential relay means responsive to said voltages $E_4$ and $E_5$.

5. A radio bomb release system including radio reflection means providing output voltages $E_1 = a(bR-S)$, $E_2 = cbR$, and $E_3 = kH$, wherein $a$, $c$, and $k$ are constants, $b$ is a factor determined by an adjustment of said means, R and S are slant range and slant speed respectively of a bombing craft with respect to a selected target, and H is the altitude of said craft, a time shaft, clock means for rotating said time shaft normally at a substantially constant speed, means for superimposing corrections upon the constant speed rotation of said shaft in response to said voltage $E_1$ to maintain said shaft in a position corresponding to the time from target, T, means responsive to the position of said time shaft to control the value of said factor $b$ so that said voltage $E_1$ is maintained at zero substantially continuously, means responsive to the position of said time shaft and to said voltage $E_3$ to provide a voltage $E_4$ proportional to $H/T$, a second shaft, means responsive to the position of said second shaft and to said voltage $E_2$ to provide a voltage $E_6$, means responsive to the difference between said voltage $E_6$ and said voltage $E_4$ to rotate said second shaft, whereby said difference $E_6-E_4$ is maintained at zero, means responsive to the position of said second shaft to superimpose a further control upon said factor $b$, means responsive to the position of said time shaft to provide a voltage $E_5$ proportional to T, and differential relay means responsive to said voltages $E_4$ and $E_5$.

6. The method of controlling an aircraft bomb release system, including the steps of producing first, second and third voltages proportional respectively to altitude H, slant range R, and slant speed S, of a bombing aircraft with respect to a selected target, controlling the proportionality of said second voltage with respect to said slant range as a function of said slant speed and slant range voltages, further controlling the proportionality of said second voltage with respect to said slant range as a function of said slant range and altitude voltages, and effecting bomb release upon the occurrence of a predetermined relationship between said altitude voltage and said first control function.

No references cited.